US012638606B2

(12) United States Patent
Yoo et al.

(10) Patent No.: US 12,638,606 B2
(45) Date of Patent: May 26, 2026

(54) SYSTEMS AND METHODS FOR SEISMIC IMAGE GENERATION USING DEEP LEARNING NETWORKS

(71) Applicant: SAUDI ARABIAN OIL COMPANY, Dhahran (SA)

(72) Inventors: Jewoo Yoo, Delft (NL); Roald G. van Borselen, Voorschoten (NL); Rolf H. Baardman, Rotterdam (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 523 days.

(21) Appl. No.: 18/189,823

(22) Filed: Mar. 24, 2023

(65) Prior Publication Data

US 2024/0319393 A1 Sep. 26, 2024

(51) Int. Cl.
G01V 1/34 (2006.01)
G01V 1/18 (2006.01)
G01V 1/38 (2006.01)
G06N 3/0464 (2023.01)

(52) U.S. Cl.
CPC .............. G01V 1/345 (2013.01); G01V 1/181 (2013.01); G01V 1/186 (2013.01); G01V 1/3852 (2013.01); G06N 3/0464 (2023.01)

(58) Field of Classification Search
CPC ........ G01V 1/345; G01V 1/181; G01V 1/186; G01V 1/3852; G01V 2210/614; G01V 1/282; G01V 1/303; G06N 3/0464; G06N 3/045; G06N 3/08
See application file for complete search history.

(56) References Cited

U.S. PATENT DOCUMENTS

| | | | |
|---|---|---|---|
| 11,105,942 B2 | 8/2021 | Alwon | |
| 11,313,994 B2 | 4/2022 | Salman et al. | |
| 11,442,197 B2 | 9/2022 | Craft et al. | |
| 12,013,508 B2 * | 6/2024 | Hegge | G06N 3/08 |

(Continued)

OTHER PUBLICATIONS

Wang, Qing et al., "A method of ghost wave suppression in multi component seismic data based on dual-sensor summation technique"; SEG Global Meeting Abstracts; SEG 2017 Workshop: OBN/OBC Technologies and Applications; pp. 87-90; Oct. 2017 (4 pages).

(Continued)

*Primary Examiner* — Mohammad K Islam

(74) *Attorney, Agent, or Firm* — Osha Bergman Watanabe & Burton LLP

(57) ABSTRACT

Methods and systems are disclosed. The method include generating a simulated seismic training dataset, where the simulated seismic training dataset includes upgoing signals and downgoing signals, each recorded on hydrophones and geophones and training a deep learning network, using the simulated seismic training dataset, to separate the upgoing signals from the downgoing signals. The method also includes obtaining field hydrophone data and field geophone data pertaining to a subsurface region of interest, recorded by a seismic acquisition system including hydrophones and geophones, and separating the field hydrophone data and field geophone data into predicted upgoing signals. The method further includes generating a seismic image of the subsurface region of interest based, at least in part, on the predicted upgoing signals.

18 Claims, 16 Drawing Sheets

(56) References Cited

U.S. PATENT DOCUMENTS

| | | | |
|---|---|---|---|
| 12,032,111 B2 * | 7/2024 | Zwartjes | ................. G01V 1/02 |
| 12,345,153 B2 * | 7/2025 | Charara | ................. E21B 47/14 |
| 2019/0383965 A1 * | 12/2019 | Salman | ............... G06N 3/0464 |
| 2021/0239869 A1 | 8/2021 | Beam et al. | |
| 2021/0247534 A1 | 8/2021 | Bø | |
| 2022/0099855 A1 * | 3/2022 | Li | .......................... G01V 1/302 |
| 2022/0221609 A1 * | 7/2022 | Peng | ........................ G06N 3/04 |
| 2022/0413172 A1 * | 12/2022 | Gashawbeza | .......... G01V 1/303 |
| 2024/0012168 A1 * | 1/2024 | Singh | .................... G01V 1/282 |

OTHER PUBLICATIONS

Kumar, A. et al., "Simultaneous up-down separation and Vz denoise using joint sparsity recovery"; 82nd EAGE Annual Conference & Exhibition; vol. 2021; pp. 1-5; Oct. 2021 (5 pages).

Zhang, Dongliang et al., "A review of OBN processing: challenges and solutions"; Journal of Geophysics and Engineering; vol. 18, Issue 4; pp. 492-502; Aug. 2021 (11 pages).

Pacal, Emin Emrah, Seismic Imaging With Ocean-Bottom Nodes (OBN): New Acquisition Designs and the Atlantis 4C OBN Survey; A thesis presented to the Department of Earth and Atmospheric Sciences in partial fulfillment of the requirements for the degree of Master of Science; University of Houston; pp. ii-127; May 2012 (147 pages).

Pacal, E. Emrah et al., "Seismic Imaging with Ocean-Bottom Nodes (OBN): Mirror Migration Technique"; SEG Technical Program Expanded Abstracts 2015; pp. 4039-4043; 2015 (5 pages).

Liang, Hong et al., "Geophone noise attenuation after dual sensor summation for ocean bottom data in the wavelet domain"; GeoConvention 2019; pp. 1-5; May 2019 (5 pages).

* cited by examiner

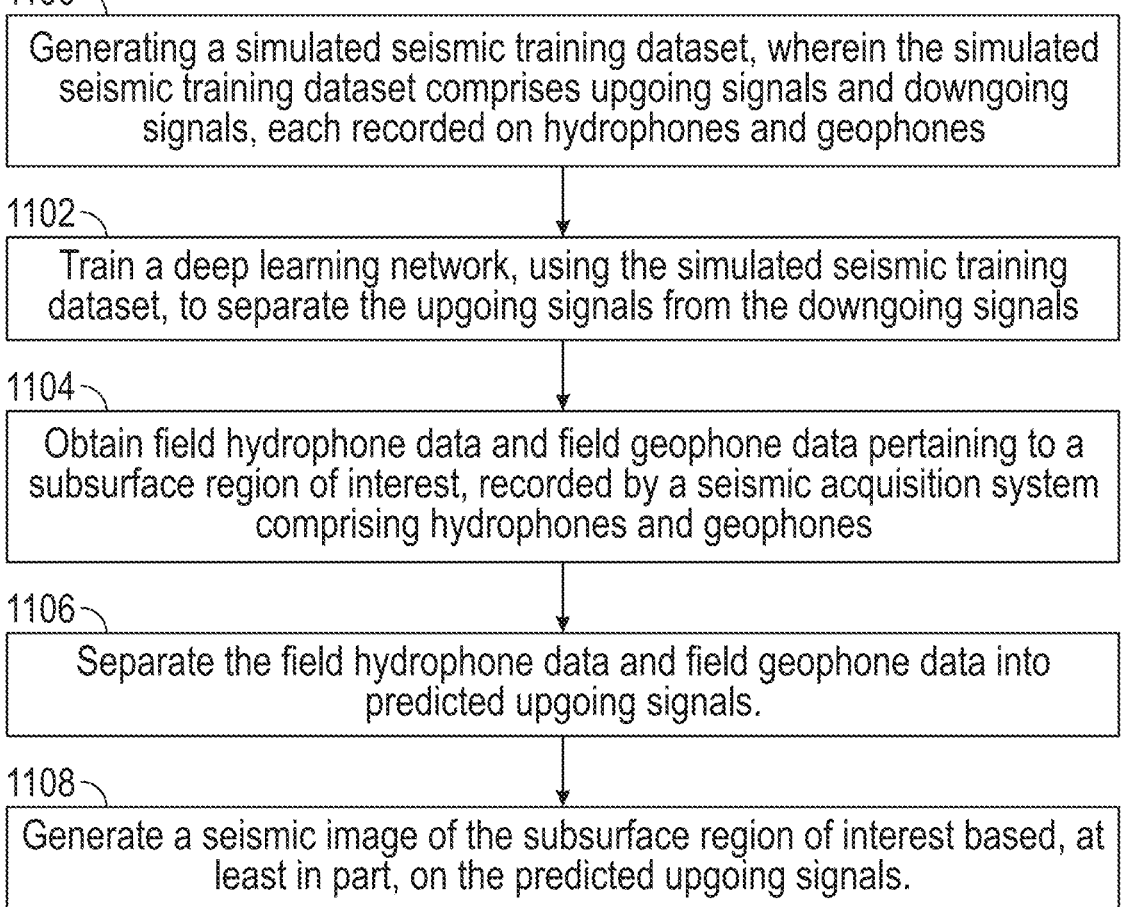

1100 —
Generating a simulated seismic training dataset, wherein the simulated seismic training dataset comprises upgoing signals and downgoing signals, each recorded on hydrophones and geophones 1102 —
Train a deep learning network, using the simulated seismic training dataset, to separate the upgoing signals from the downgoing signals 1104 —
Obtain field hydrophone data and field geophone data pertaining to a subsurface region of interest, recorded by a seismic acquisition system comprising hydrophones and geophones 1106 —
Separate the field hydrophone data and field geophone data into predicted upgoing signals.

1108 —
Generate a seismic image of the subsurface region of interest based, at least in part, on the predicted upgoing signals.

FIG. 11

SYSTEMS AND METHODS FOR SEISMIC IMAGE GENERATION USING DEEP LEARNING NETWORKS

BACKGROUND

The oil and gas industry routinely uses seismic surveys to create images of the subsurface and detect potential hydrocarbon reservoirs. Seismic data must be processed to produce seismic images and seismic imaging methods typically assume the signals they are processing are upward-propagating when recorded after being reflected at subsurface layers. However, recorded marine seismic data may also include downward propagating signals that, although reflected by subsurface layers, were subsequently reflected back down from the sea surface. Such signals may be called ghosts. Ghosts will be recorded with opposite polarity by hydrophone and geophone sensors. (The former measuring pressure, P, the latter measuring vertical displacement, Z.) Therefore, when appropriately scaled and added together, the ghost events in the hydrophone and geophone data should interfere destructively, whereas for an upgoing signal, the seismic events should constructively interfere. Thus summing the P and Z signals ("PZ summation") should strengthen upgoing signals while attenuating or removing downgoing signals, thus improving the resulting quality of a seismic image produced from the data. Typically, the PZ summation method is implemented for multi-component datasets acquired by an ocean bottom node (OBN) or ocean bottom cable (OBC).

However, the implementation of PZ summation can be difficult due to scaling issues, coupling discrepancies, and sensitivity differences between the hydrophones and geophones in field data. Moreover, in addition to the compressional waves, shear-waves and Scholte-waves are also recorded by the geophones which will lead to artifacts in the resulting PZ summation. Thus, the conventional PZ summation requires pre-processing steps to properly calibrate the P and Z data and to attenuate random noise, shear-waves and Scholte-waves. These pre-processing steps are very important for successful PZ summation and, for every dataset separately, require effort to find the correct parameters.

Accordingly, there exists a need for a method that bypasses the difficulties of conventional PZ summation to remove ghost signals.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a method. The method includes generating a simulated seismic training dataset, where the simulated seismic training dataset includes upgoing signals and downgoing signals, each recorded on hydrophones and geophones, and training a deep learning network, using the simulated seismic training dataset, to separate the upgoing signals from the downgoing signals. The method also includes obtaining field hydrophone data and field geophone data pertaining to a subsurface region of interest, recorded by a seismic acquisition system including hydrophones and geophones, and separating the field hydrophone data and field geophone data into predicted upgoing signals. The method further includes generating a seismic image of the subsurface region of interest based, at least in part, on the predicted upgoing signals.

In some aspects, the techniques described herein relate to a non-transitory computer-readable memory including computer-executable instructions stored thereon that, when executed on a processor, cause the processor to perform steps. The steps include generating a simulated seismic training dataset, where the simulated seismic training dataset includes upgoing signals and downgoing signals, each recorded on hydrophones and geophones, and training a deep learning network, using the simulated seismic training dataset, to separate the upgoing signals from the downgoing signals. The steps also include obtaining field hydrophone data and field geophone data pertaining to a subsurface region of interest, recorded by a seismic acquisition system including hydrophones and geophones, and separating the field hydrophone data and field geophone data into predicted upgoing signals. The steps further include generating a seismic image of the subsurface region of interest based, at least in part, on the predicted upgoing signals.

In some aspects, the techniques described herein relate to a system. The system includes a field hydrophone and a field geophone, and a computer system, configured to generate a simulated seismic training dataset that includes upgoing signals and downgoing signals, each recorded on hydrophones and geophones. The system further includes training a deep learning network, using the simulated seismic training dataset, to separate the upgoing signals from the downgoing signals. Additionally, the system obtains field hydrophone data and field geophone data pertaining to a subsurface region of interest, recorded by a seismic acquisition system including hydrophones and geophones, and separates the field hydrophone data and field geophone data into predicted upgoing signals using the trained deep learning network. Furthermore, the system generates a seismic image of the subsurface region of interest based, at least in part, on the predicted upgoing signals.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 11 presents a workflow of the method in accordance with one or more embodiments.

DETAILED DESCRIPTION

Figure 1:
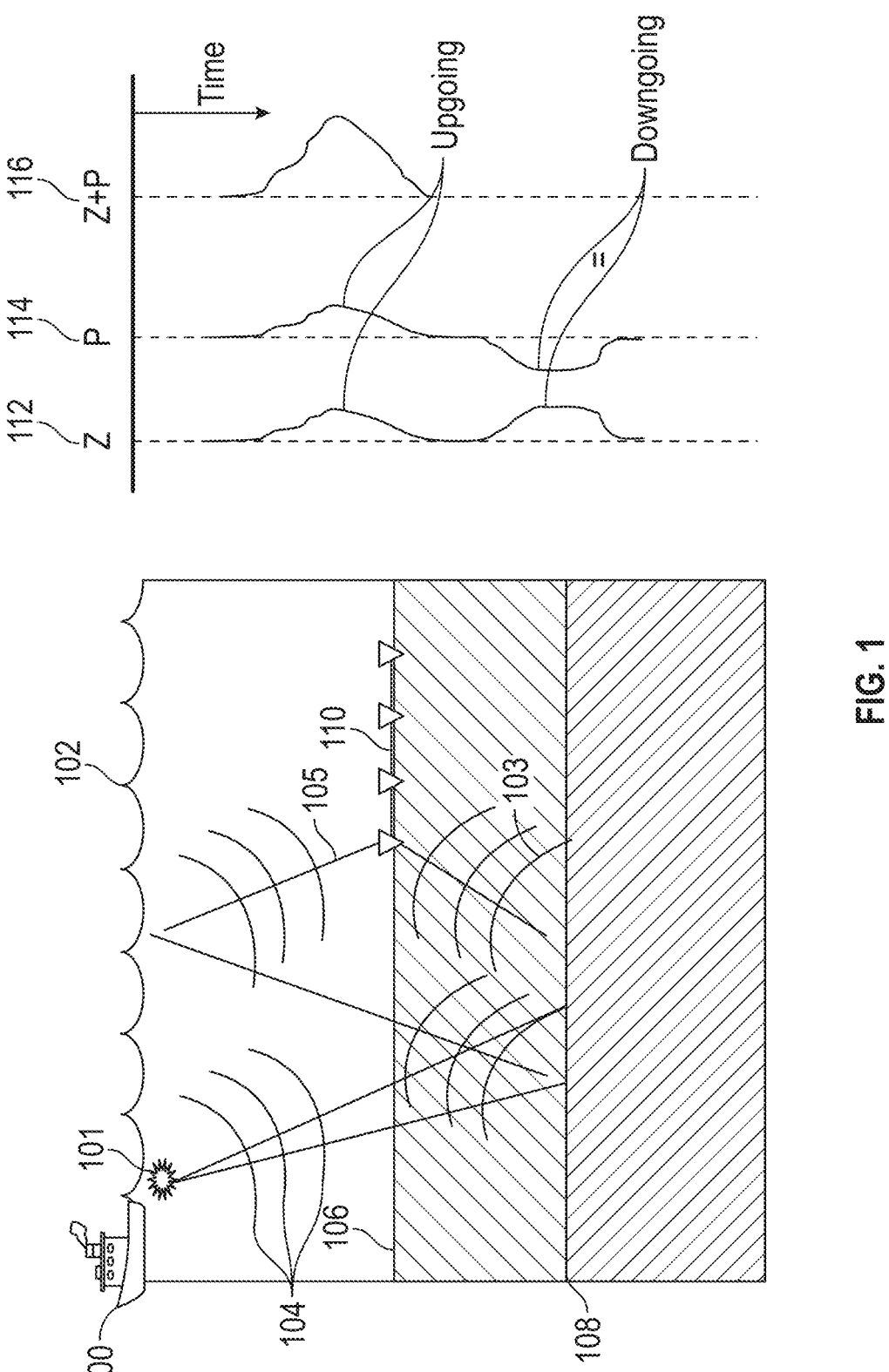
FIG. 1 shows upgoing and downgoing waves recorded by an ocean bottom cable in accordance with one or more embodiments.

In one aspect, embodiments disclosed herein relate to systems and a method for PZ summation using a artificial intelligence (AI)-based deep learning approach trained with a synthesized dataset. Embodiments of the present disclosure may provide at least one of the following advantages: The AI-based method does not require any parameters and has a low computational cost to run. Furthermore, the method to generate the training data is fast and uses randomly defined parameters, thus allowing for the creation of a large dataset and therefore better generalizability of the deep learning method.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "seismic signal" includes reference to one or more of such signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-12, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

PZ summation is a method to mitigate the deleterious effects that ghost signals (105) found in seismic data have on seismic images. FIG. 1 shows one example of a subsea geometry that would produce ghost signals. A seismic source (101) is towed by a ship (100) on the sea surface (102). This generates seismic waves (104) that travel down through the sea floor (106) and are reflected by boundaries between subsurface rock formations (108). These reflections may propagate as upgoing signals (103) back to the sea surface, and there reflect again and propagate as downgoing signals (105) (ghosts) to the ocean floor where they may be detected by an array of sensors (110) deployed in sensor packages, such as ocean bottom nodes (OBN) or ocean bottom cables (OBC). Each sensor may include a collocated hydrophone and geophone.

The PZ summation adds the vertical component of the geophone (Z) signal (112) to the pressure component of the hydrophone (P) signal (114); since the ghost signal (i.e., a downgoing multiple wave) is recorded with opposite polarity by the hydrophone compared to the geophone, the two signals should cancel each other out, resulting in the summed signal (116). Conversely, the hydrophone and geophone recordings of singly-reflected signals (103) have identical polarity and should constructively interfere.

Practical implementation of PZ summation methods can be complicated by a number of factors. First, pressure and particle velocity have different physical units and a conversion factor, dependent on the mass density of the material, must be defined. Second, the sensitivities of hydrophones and geophones may differ in frequency dependent ways and these differences must be corrected. Furthermore, in addition to upgoing and downgoing compressional ("primary", "pressure", or "P-") waves, other modes, such as shear waves and Scholte waves propagating along the seabed may be recorded by the geophones. These other modes must be identified and removed or attenuated prior to PZ summation. Thus, conventional PZ summation may require extensive pre-processing steps to properly calibrate the P and Z data and attenuate random noise, shear waves, and Scholte waves. These pre-processing steps are essential for successful PZ summation and require significant effort to manually tune adjustable parameters.

The embodiments disclosed herein that provide for attenuating or removing ghosts using PZ summation are enabled by a deep learning network trained with a synthetic training dataset. This method may be faster and bypasses the problems associated the conventional PZ summation method, described above. As such, the disclosed embodiments represent an improvement over the existing convention PZ summation for attenuating ghost signals.

The quality of the deep learning method depends on two factors: the data used to train it and the type of neural network. The more realistic the training data, and the larger the quantity of them, the more accurate the results.

The goal of the trained neural network is to compute robust PZ summation results on field data not seen in the training procedure, a property known as generalization. A network's ability to generalize increases with the size and variability of the training dataset. Without large quantities of realistic training data, generalization of a network is hard to achieve and, as a result, retraining of the network becomes necessary when it is confronted with a new dataset.

There are several possible sources of a training dataset. Field data examples may be used, synthetic hydrophone/ geophone datasets may be created, or both types of data may be combined. Field examples are limited in quantity, thus limiting their usefulness in ensuring generalization of trained deep learning network. Similarly, synthetic hydrophone/geophone datasets generated using numerical solutions of the wave-equation are computationally intensive to create. Embodiments disclosed herein provide a novel alternative to using field data or traditional synthetics datasets from numerical wave-equation simulations. These embodiments generate randomized training sets using canonical seismic events that, in turn, produce diverse output data and allow for the generalization of the trained U-net neural network.

Figure 2A:
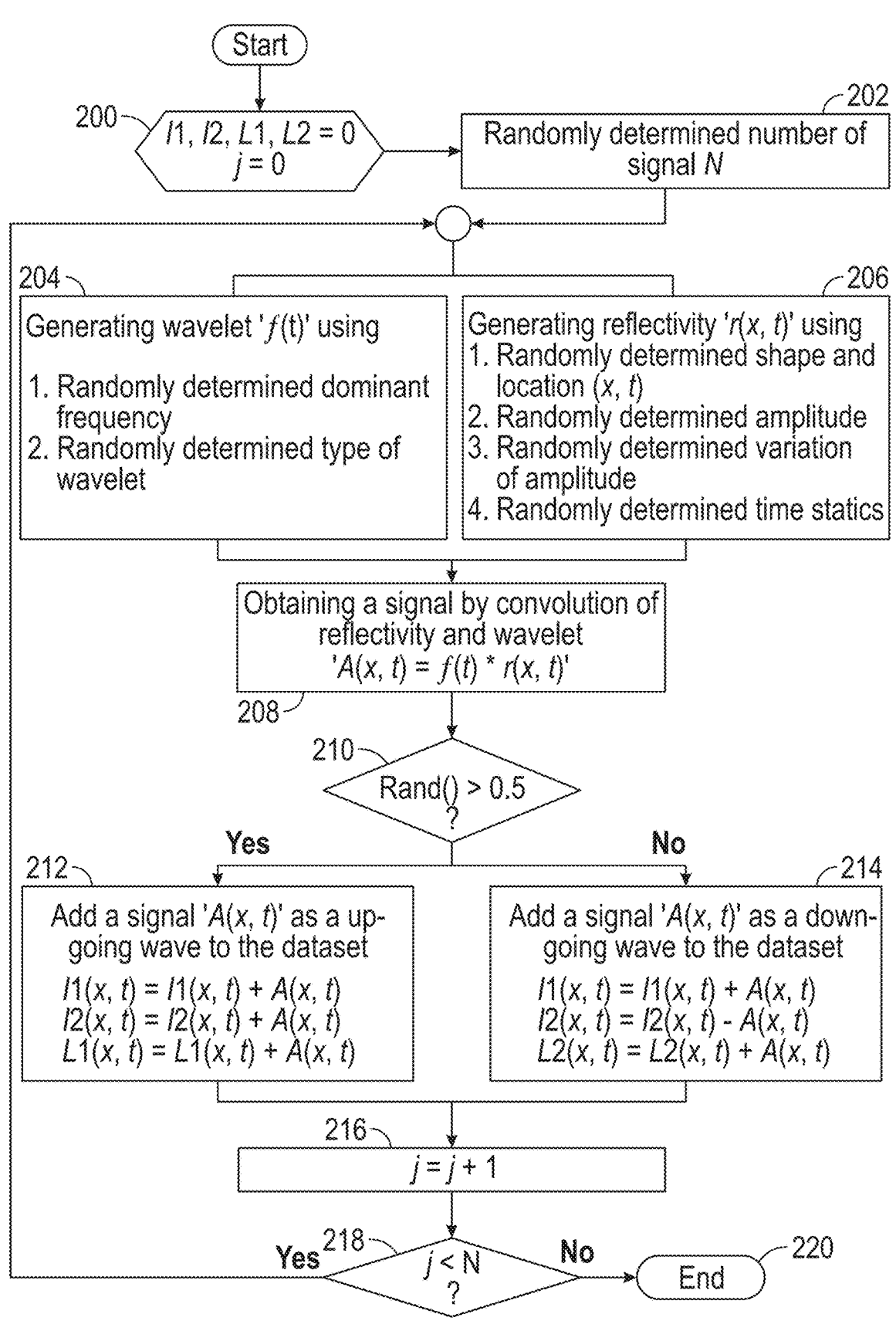
FIG. 2A shows a procedure for creating training data in accordance with one or more embodiments.

FIG. 2A presents the technique for simulating a hydrophone/geophone dataset. It starts by initializing four fields of seismic data, I1(x,t), I2(x,t), L1(x,t), and L2(x,t), along with a counter j in Step 200. I1(x,t) is Input 1, and corresponds to the input hydrophone signal (P), I2(x,t) is Input 2, and corresponds to the input geophone signal (Z). L1(x,t) is the expected linear superposition, i.e., the summation, of the P and Z signals, which approximates a P upgoing signal, the desired output of the deep learning method. L2(x,t) represents all the multiply reflected downgoing waves and will be referred to as the P downgoing signal. L1 is the desired P upgoing portion of the seismic wavefield that is conventionally required for further professing, including seismic imaging. L2 is the undesired P down-going portion of the wavefield in the aspect of the de-ghosting process. Initially, I1, I2, L1, and L2 are all set to zero.

Adding together the P upgoing and P downgoing wavefields at the end of the procedure described below should reproduce the P input. If it does not, artifacts have been introduced by the machine learning algorithm. Thus, keeping track of L2 is useful for quality control of the method.

In Step 202, the number of events, N, in the seismic data is randomly chosen. In Step 204, a center frequency and a type of wavelet are randomly selected. From the center frequency and wavelet type, a wavelet, $f(t)$, is constructed as a function of two-way time. In parallel with Step 204, Step 206 generates a field of reflectivity, r(x,t), in space and two-way time by randomly creating curves in the reflectivity field, randomly determining the amplitudes of the curves (that is, how strongly the curved event deviates from the background), randomly determining the variations in amplitude along the curve, and randomly determining time statics (i.e., vertical shifts in the seismic signals caused by variable elevation and shallow low velocity zones at the sea floor).

The curves used in this embodiment are lines and hyperbolas, and may be given by the following equations, respectively:

$$t = a * x + b$$
$$t = \sqrt{a^2 + x^2/b^2 + c}$$

For suitably chosen constants, the location of these two curves may be changed within the image. Although only lines and hyperbolas are used in the examples presented here, any parametrized curve may be used.

Continuing with the steps of the technique, in Step 208, the wavelet, $f(t)$, is convolved in the time dimension with the reflectivity field, r(x,t), to create seismic data, A(x,t). In Step 210, a random number is generated between 0 and 1. If the random number is greater than 0.5, then Step 212 is implemented. Alternatively, if the random number is less than or equal to 0.5, then Step 214 is implemented. If Step 212 is implemented, the seismic data A(x,t) is added to the dataset as an upgoing wavefield. As an upgoing wave, A(x,t) is added to I1(x,t) (the hydrophone data), and it is added to I2(x,t) (the geophone data). It is also added to L1(x,t) (the P upgoing data), since this is the ideal output of a method for PZ summation.

If Step 214 is implemented, A(x,t) is added to the dataset as a downgoing wavefield. Thus A(x,t) is added to the hydrophone data, I1(x,t), but subtracted from the geophone data, I2(x,t). This simulates the inversion of polarity that particle motion undergoes when a wave is reflected back down from a free surface (e.g., the sea surface). Since it is a downgoing wave, A(x,t) is added to L2(x,t) which represents the dataset of downgoing waves.

Next, in Step 216, the counter j is incremented by 1. In Step 218, if j=N, the technique proceeds to Step 220 and the simulation stops. If j<N, Step 218 moves back to Steps 204 and 206.

Figure 2B:
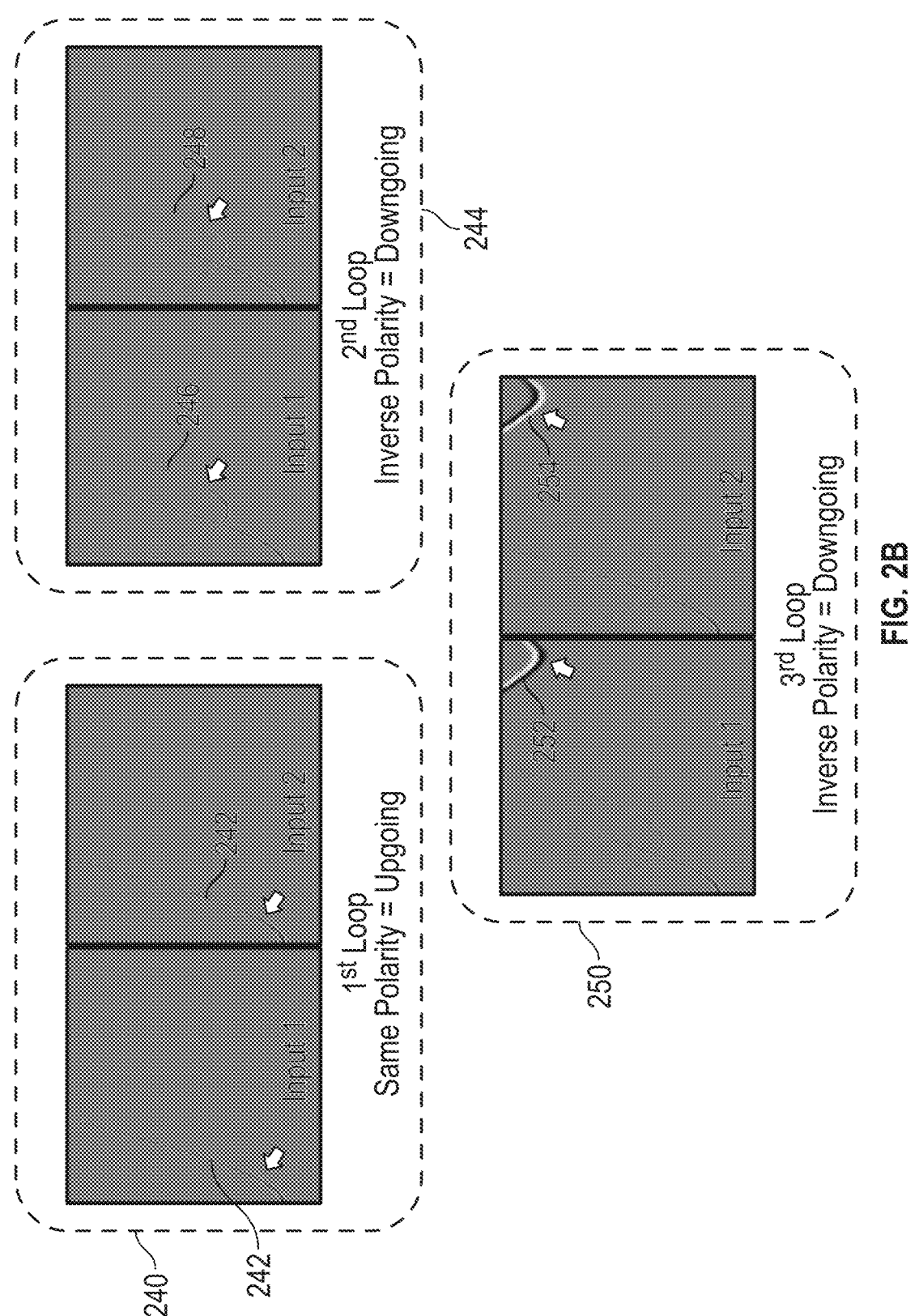
FIG. 2B shows steps in the simulation procedure in accordance with one or more embodiments.

Summarizing, by the procedure of this simulation technique as presented in FIG. 2A, at each iteration of the loop a curve is created and added to the reflectivity field, r(x,t), convolved with a random wavelet, $f(t)$, and added to a training image as either an upgoing or a downgoing wave. FIG. 2B shows an example of three loops (iterations) of the technique displayed as three separate seismic images. Each seismic image displays distance along the horizontal direction and two-way travel time on the vertical axis. When written to I1 (hydrophone data), the grayscale value indicates pressure. When written to I2 (geophone data), the grayscale value indicates vertical displacement.

In the $1^{st}$ loop (240), an upgoing wave is created which is manifested by a first hyperbola (242) in hydrophone data (Input 1). Since it is an upgoing wave, it is manifested identically in the geophone data (Input 2). In the $2^{nd}$ loop (244), a second hyperbola (246) is manifested in the hydrophone data (Input 1). But, since it is a downgoing wave, it is manifested as an inverted polarity second hyperbola (248) in the geophone data (Input 2). In the $3^{rd}$ loop (250), a third hyperbola (252) is manifested in hydrophone data (Input 1). Since it is a downgoing wave, it is manifested as an inverted third hyperbola (254) in the geophone data (Input 2).

In order to increase the realism of the synthetic data, noise is added separately to the hydrophone and geophone data. The noise may be both coherent noise and random noise. An amplitude distortion may also be incorporated into the data in the form of a point-by-point multiplicative weighting of the synthetic data. Incorporating the noise and the amplitude distortion into the training data makes a deep learning method more robust with respect to noise found in real data.

Figure 3:
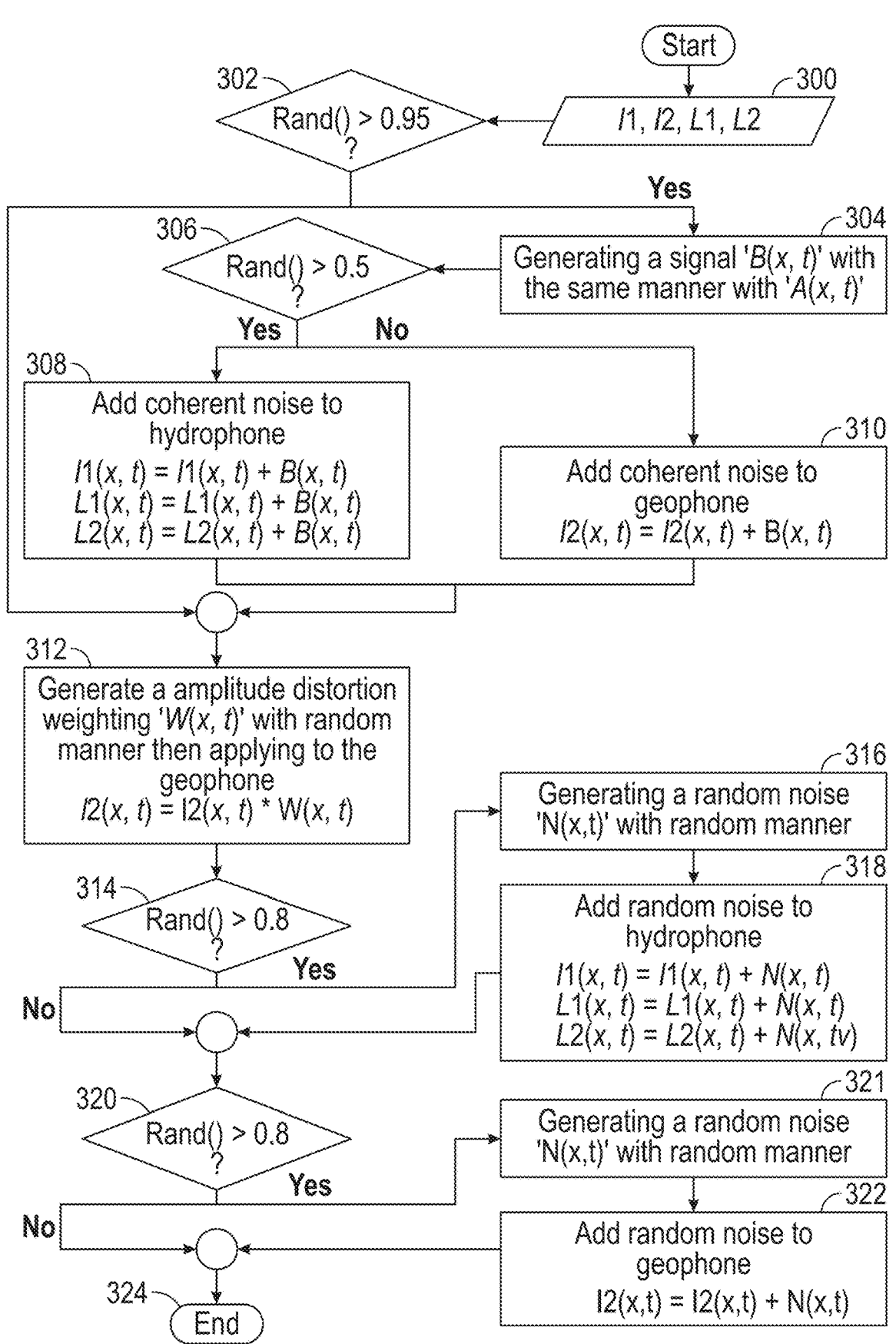
FIG. 3 shows the procedure for adding noise to training data in accordance with one or more embodiments.

FIG. 3 shows an embodiment for adding both coherent and random noise, as well as an amplitude distortion, to the simulated seismic data, A(x,t). It begins in Step 300 with the same fields of data: I1(x,t), I2(x,t), L1(x,t), and L2(x,t). In Step 302 a random number between 0 and 1 is generated and compared with 0.95. If it is greater than 0.95, the technique proceeds to Step 304. If less than or equal to 0.95, the technique proceeds to Step 312. In Step 304, a new field of data, B(x,t), is created in the identical manner as A(x,t). In Step 306, another random number between 0 and 1 is generated. If the number is greater than 0.5, the technique proceeds to Step 308. If the number is less or equal to than 0.5, the technique proceeds to Step 310.

In Step 308, the new field of coherent noise, B(x,t), is added to I1(x,t) (the hydrophone data), L1(x,t), and L2(x,t) as coherent noise. Alternatively, if Step 310 is followed, the coherent noise, B(x,t), is added to I2(x,t) (the geophone data). Following either Step 304, 308, or 310, Step 312 is implemented. In Step 312, an amplitude distortion field, W(x,t), is simulated and then multiplied in a point-by-point fashion with I2(x,t). Next, in Step 314, another random number between 0 and 1 is generated. If that number is greater than 0.8, the technique proceeds to Step 316, where a field of random noise, N(x,t), is generated. Gaussian white noise was used in the examples presented here, but this is not a limitation of the method. Noise from other statistical distributions will work, as well. Different signal-to-noise ratios of the random noise may be set for each training data.

If the random number from Step 314 is less than or equal to 0.8, the technique proceeds to Step 320. Step 318 follows Step 316. In Step 318, the noise, N(x,t), is added to the fields of hydrophone data, I1(x,t), as well as to the P upgoing data, L1(x,t), and the P downgoing data, L2(x,t). In Step 320, another random number between 0 and 1 is generated. If the random number is greater than 0.8, the technique proceeds to Step 321, where N(x,t) is replaced with another field of random noise. Step 322 follows Step 320. In Step 322, N(x,t) is added to the geophone data, I2(x,t). If the random number in Step 320 is less than or equal to 0.8, the technique proceeds to Step 324 and terminates.

Figure 4:
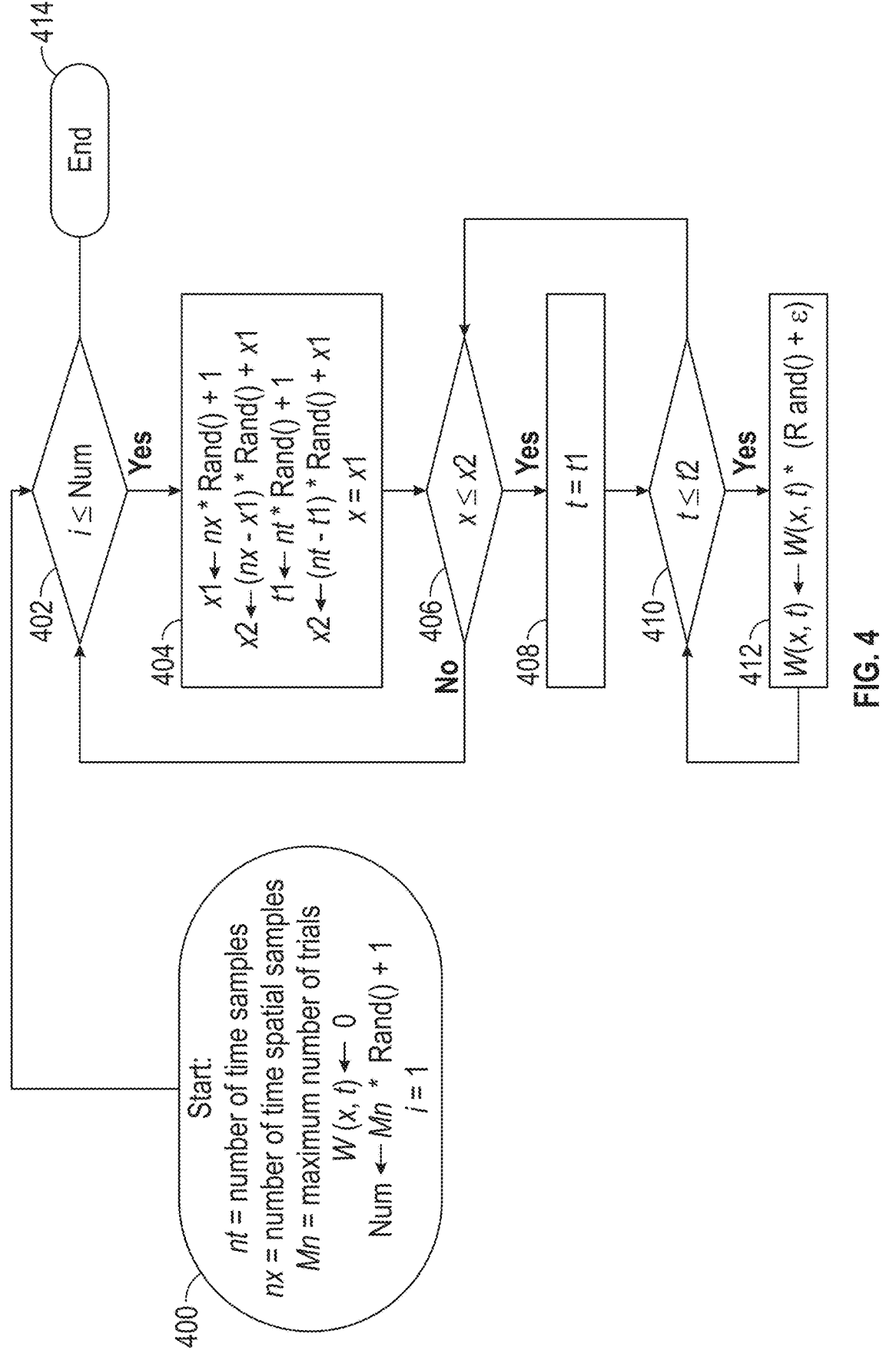
FIG. 4 shows a flowchart for creating amplitude distortion weighting in accordance with one or more embodiments.

FIG. 4 outlines a flowchart for generating the amplitude distortion field, W(x,t). First, in Step 400, the distortion field, W(x,t), and several parameters, nt, nx, Mn, Num, and i are initialized, nt is the number of iterations, nx is the number of spatial samples, Mn is the maximum number of trials, and i is the counter for each trial. W(x,t) is initialized a field of all zeros. Mn is multiplied by a random number between 0 and 1, 1 is added to that number, then converted to an integer, and then assigned to a parameter Num. Num is the number of iterations of a first loop.

In Step 402 i is compared to Num. If it is less than or equal to Num, the flowchart proceeds to Step 404 and the first loop begins. If i is greater than Num, the flowchart proceeds to Step 414 and terminates. In Step 404, nx is multiplied by a random number between 0 and 1 and added to 1, then converted to an integer. This value is assigned to x1. x1 is subtracted from nx, then multiplied by a random number between 0 and 1 and added to x1, then converted to an integer. This value is assigned to x2, nt is multiplied by a random number between 0 and 1 and added to 1, then converted to an integer. This value is assigned to t1. t1 is subtracted from nt, then multiplied by a random number between 0 and 1, added to t1, and then converted to an integer. This value is assigned to t2. x1 is assigned to a variable x.

Next, a second and third loop are run. In Step 406, x is compared with x2. If x is less than or equal to x2, t1 is assigned to a variable t in Step 408 and the third loop is entered. However, if x is greater than x2, the flowchart returns to Step 402. After Step 408, the flowchart proceeds to Step 410, where t is compared to t2. If t is less than or equal to t2, the flowchart proceeds to Step 412. If t is greater than t2, the flowchart returns to Step 406. In Step 412, a random number between 0 and 1 is generated, added to a small constant, E, and multiplied by the value W(x,t) at x and t, and then overwrites the value W(x,t). After Step 412, the flowchart returns to Step 410. In this way, through three nested loops, each value in the field W(x,t) is visited Num times and the value is modified through a multiplication.

Figure 5A:
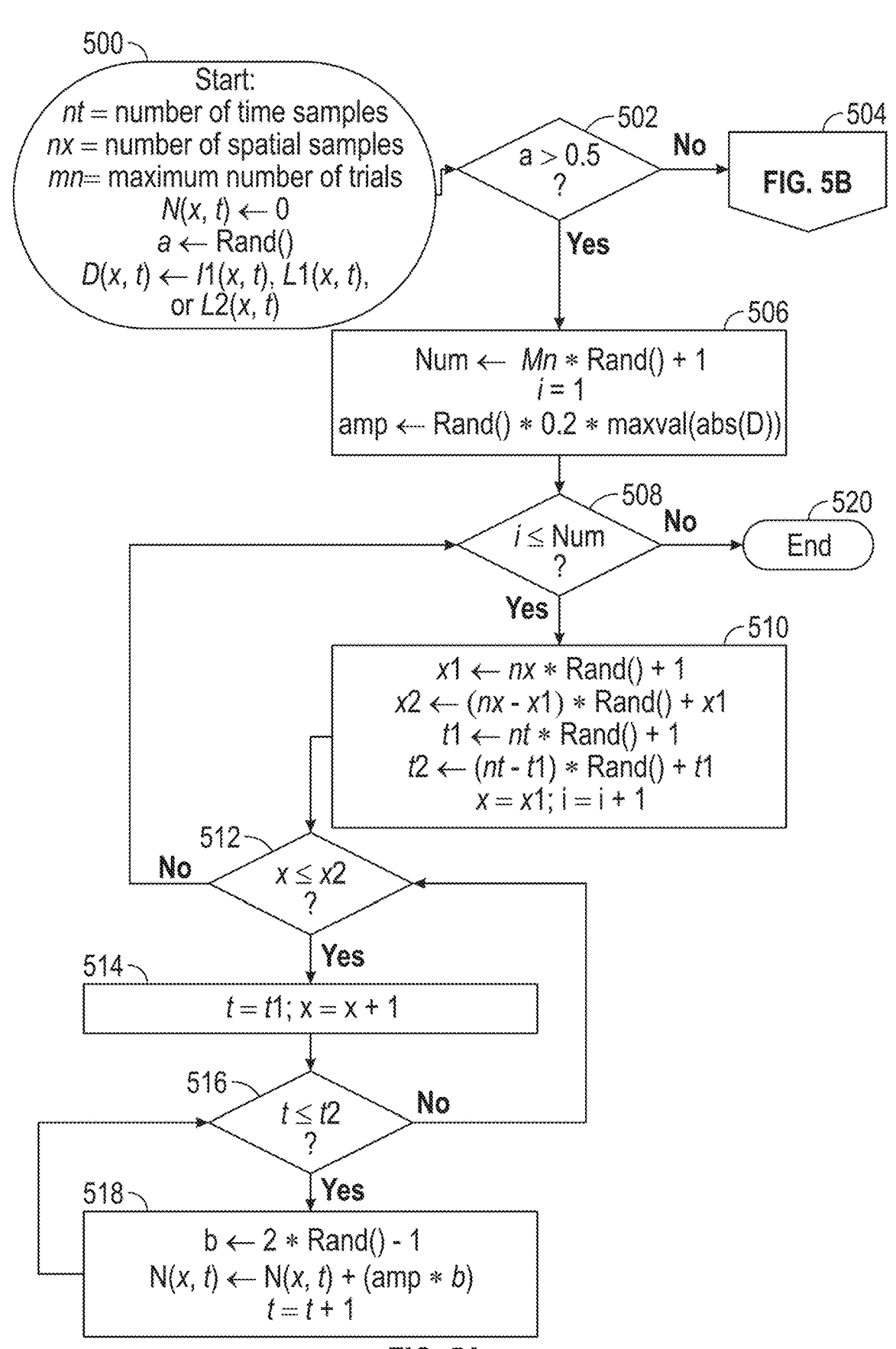
FIG. 5A shows a flowchart for creating random noise in accordance with one or more embodiments.

FIG. 5A outlines part of a flowchart for generating the random noise field, N(x,t). First, in Step 500, parameters nt, nx, and Mn, are initialized, nt is the number of time samples, nx is the number of spatial samples, and Mn is the maximum number of trials. Furthermore, N(x,t) is initialized to 0, and a random number between 0 and 1 is assigned to a parameter a, and the field of either I1(x,t), I2(x,t), L1(x,t), or L2(x,t) is assigned to a field D(x,t); which one depends on which field is having noise added to it. (All fields receive noise in the same way according to the technique shown in FIG. 3.)

In Step 502, a is compared to 0.5. If a is greater than 0.5, a first branch of the flowchart is executed, shown in its entirety in FIG. 5A. If a is less than or equal to 0.5, the flowchart proceeds to Step 504 and a second branch of the flowchart is executed, presented in its entirety in FIG. 5B.

The first branch of the flowchart includes three nested loops. In Step 506, Mn is multiplied by a random number between 0 and 1, added to 1, converted to an integer, and assigned to Num. i is initialized to 1, and a variable amp is created by multiplying a random number between 0 and 1 by 0.2 and the maximum absolute value of the field D.

The first nested loop of the first branch is from i=1 to i=Num. In Step 508, if i is less than or equal to Num, the flowchart proceeds to Step 510. If i is greater than Num, the flowchart proceeds to Step 520 and terminates. In Step 510, nx is multiplied by a random number between 0 and 1, added to one, the result converted to an integer, and that result assigned to x1. x1 is subtracted from nx, the result multiplied by a random number between 0 and 1, and that result added to x1, then converted to an integer, and then assigned to x2, nt is multiplied by a random number between 0 and 1, added to one, the result converted to an integer, and then assigned to t1. t1 is subtracted from nt, the result multiplied by a random number between 0 and 1, that result added to t1, the result of that converted to an integer, and assigned to t2. The flowchart then proceeds to Step 512 and the second nested loop of the first branch begins. It is a loop from x1 to x2. If x is less than or equal to x2, the flowchart proceeds to Step 514. If x is greater than x2, the flowchart returns to Step 508.

Inside the second nested loop of the first branch, a third nested loop of the first branch goes from t1 to t2. In Step 514, t1 is assigned to t, and x is incremented by 1. The flowchart then proceeds to Step 516, where t is compared to t2. If t is less than or equal to t2, the flowchart proceeds to Step 518. If t is less than t2, the flowchart returns to Step 512. In Step 518, 2 is multiplied by a random number between 0 and 1, and then 1 is subtracted from the result. The resulting value is assigned to b. amp is multiplied by b and the result is added to N(x,t). This terminates all three nested loops of the first branch.

Figure 5B:
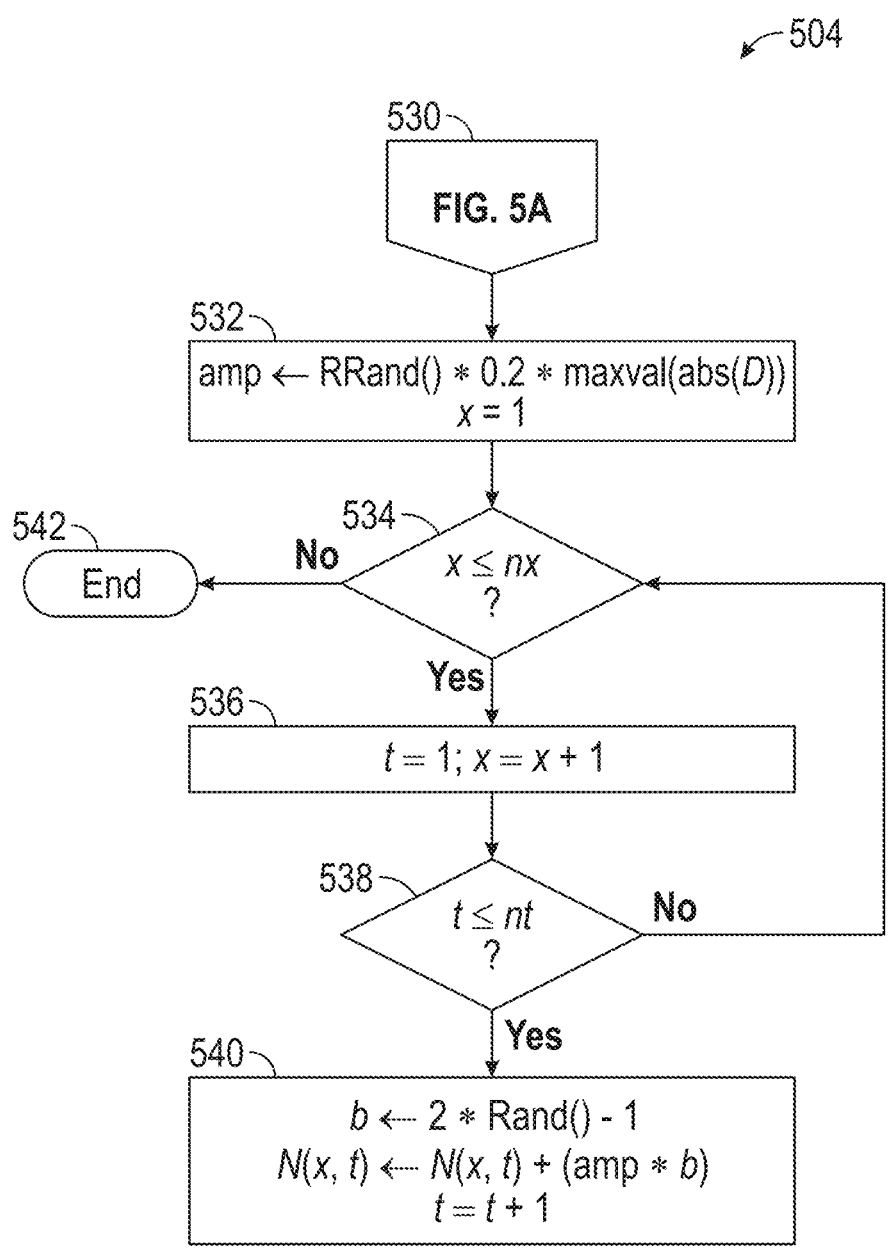
FIG. 5B shows a flowchart for creating random noise in accordance with one or more embodiments.

FIG. 5B presents a continuation of the flowchart of FIG. 5A; the starting point is Step 530. The second branch of the flowchart presented in FIG. 5B contains two nested loops. Before beginning the nested loops, in Step 532, the maximum absolute value of D(x,t) is multiplied by 0.2 and a random number between 0 and 1. The resulting value is assigned to amp. At this point the first nested loop of the second branch begins. It is a loop from 1 to nx. In Step 534, if x is less than or equal to nx, the flowchart proceeds to Step 536. If x is greater than nx, the flowchart proceeds to Step 542 and terminates. In Step 536, t is initialized to 1 and x is incremented by 1. The flowchart then proceeds to Step 538. In Step 538, if t is less than or equal to nt, the flowchart proceeds to Step 540. If t is less than nt, the flowchart returns to Step 534. In Step 540, the second nested loop of the second branch begins. A random number between 0 and 1 is multiplied by 2, and then 1 is subtracted from the result. The resulting number is assigned to b. amp is multiplied by b and the result is added to N(x,t). The result is reassigned to N(x,t). t is then incremented by 1 and the flowchart returns to Step 538.

Figure 6:
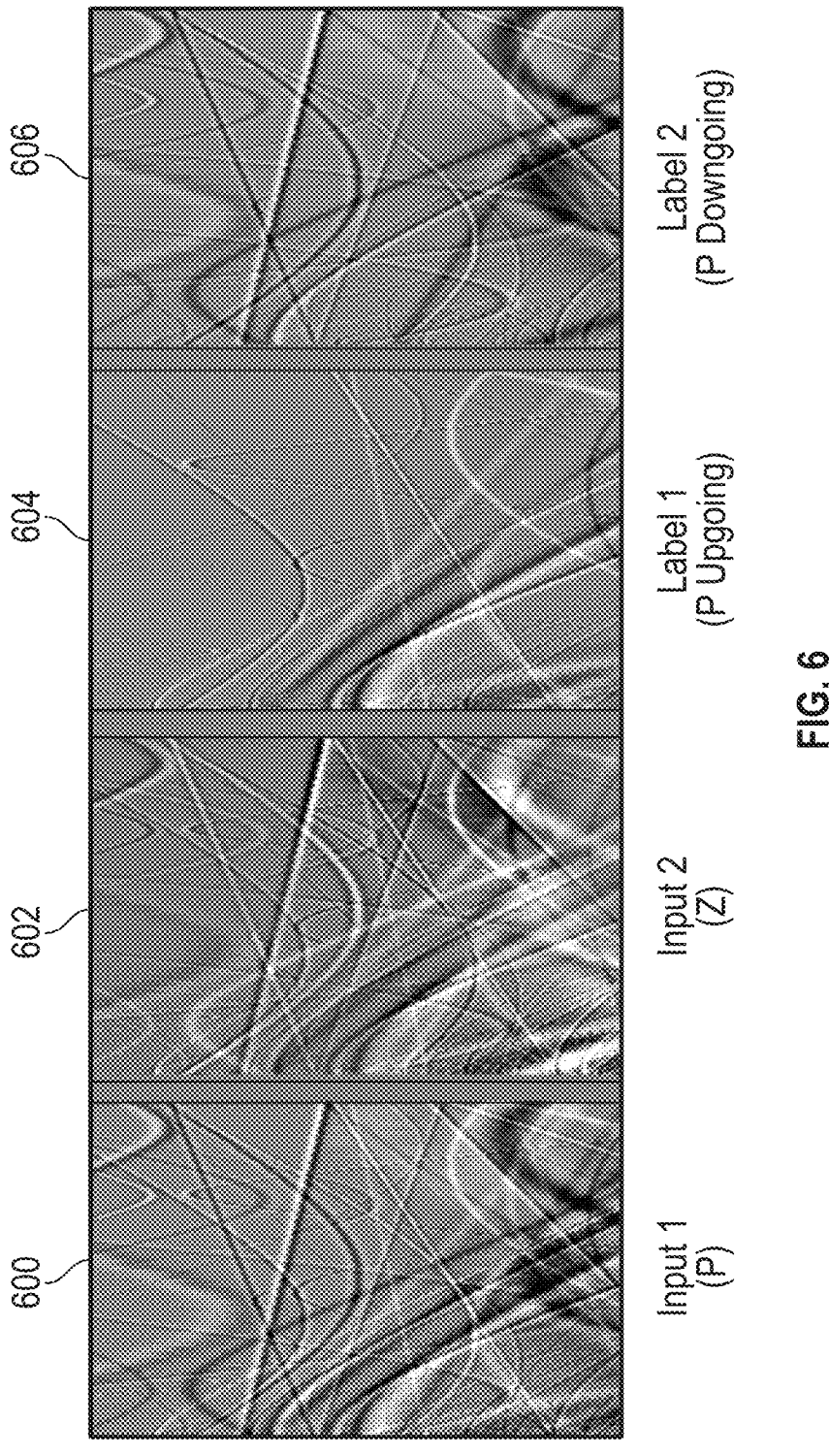
FIG. 6 shows a single input/output element in a training dataset in accordance with one or more embodiments.

FIG. 6 shows the results of the simulation procedure depicted in FIGS. 2-5. Image 600 shows Input 1, which is the simulated hydrophone data. Image 602 shows Input 2, which is the geophone data. Image 604 shows the Label 1, which is the P upgoing data. Image 606 shows the Label 2, which is the downgoing P data. Features that reverse their polarity between Image 600 and Image 602 are indicative of downgoing multiples, and thus are not present in Image 604. Image 604 represents the ideal output of a method that removes multiples from seismic data by PZ summation. As mentioned above, adding Image 604 to Image 606 (Label 2) should reproduce Image 600. If it does not, the simulation method is producing artifacts and must be reassessed.

The features of FIG. 6 include linear and hyperbolic events (due to the exclusive use of these two curves in creating a field of reflectivity values). There is also noise present in the form of amplitude distortions, random noise, and coherent noise (which is constructed by the same simulation process as the hydrophone and geophone data). This random noise may simulate the effect of static, near-surface distortions in the seismic data.

It is useful to understand that in the case of noise-free data, summing P upgoing with P downgoing wavefields will result in the hydrophone data. This can be understood as follows: Hydrophone data records both upgoing and downgoing P wave data. The geophone data switches the polarity of the hydrophone data for events that result from downgoing waves. Thus, summing the hydrophone and geophone data will give a new dataset with the events that were caused by downgoing waves being removed. This data is as if it were composed only of events coming from upgoing P waves (hence, the name 'P upgoing'). This is the desired seismic data for further processing; multiples have been removed. The multiples that have been removed are precisely those that come from downgoing waves, which are recorded in the P downgoing dataset. Recombining the P downgoing with the P upgoing will therefore reproduce the entire P wave dataset (i.e., the hydrophone data).

The simulation techniques presented above create training data that will subsequently be used in a deep learning procedure. For example, a training dataset with 10000 elements may be sufficient for the deep learning method presented below. In some embodiments, an additional 500 elements of the training dataset set may be kept aside for validation of the deep learning method. In other embodiments more or less than 10,000 training elements and more or less than 500 validation elements may be used without limitation to the scope of the invention.

Figure 7:
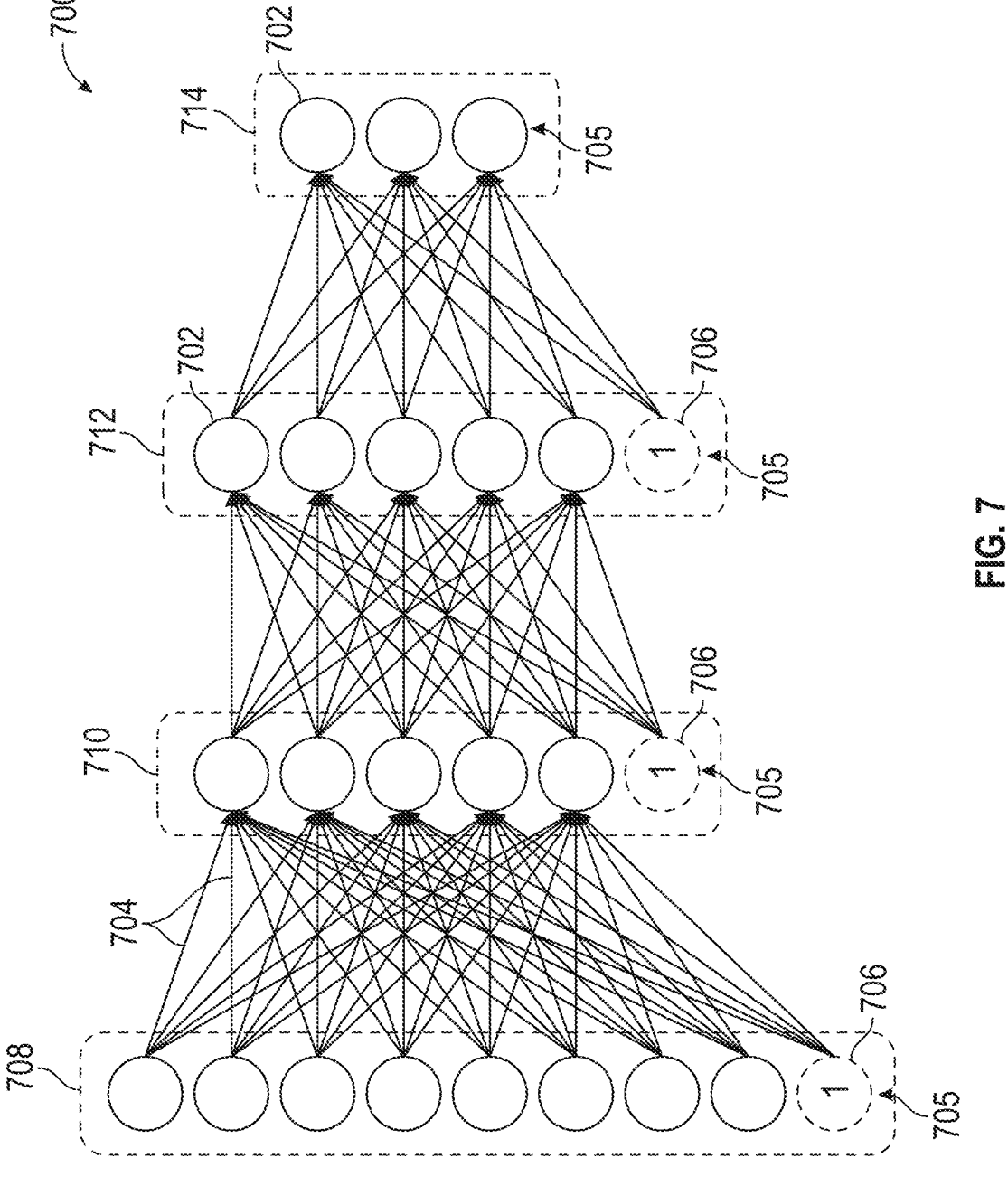
FIG. 7 shows a neural network in accordance with one or more embodiments.

FIG. 7 shows a neural network, a common ML architecture for prediction/inference. At a high level, a neural network (700) may be graphically depicted as comprising nodes (702), where here any circle represents a node, and edges (704), shown here as directed lines. The nodes (702) may be grouped to form layers (705). FIG. 2A displays four layers (708, 710, 712, 714) of nodes (702) where the nodes (702) are grouped into columns, however, the grouping need not be as shown in FIG. 2A. The edges (704) connect the nodes (702). Edges (704) may connect, or not connect, to any node(s) (702) regardless of which layer (705) the node(s) (702) is in. That is, the nodes (702) may be sparsely and residually connected. A neural network (700) will have at least two layers (705), where the first layer (708) is considered the "input layer" and the last layer (714) is the "output layer." Any intermediate layer (710, 712) is usually described as a "hidden layer". A neural network (700) may have zero or more hidden layers (710, 712) and a neural network (700) with at least one hidden layer (710, 712) may be described as a "deep" neural network or as a "deep learning method." In general, a neural network (700) may have more than one node (702) in the output layer (714). In this case the neural network (700) may be referred to as a "multi-target" or "multi-output" network.

Nodes (702) and edges (704) carry additional associations. Namely, every edge is associated with a numerical value. The edge numerical values, or even the edges (704) themselves, are often referred to as "weights" or "parameters". While training a neural network (700), numerical values are assigned to each edge (704). Additionally, every node (702) is associated with a numerical variable and an activation function. Activation functions are not limited to any functional class, but traditionally follow the form:

$$A = f\left(\sum_{i \in (incoming)} [(node\ value)_i (edge\ value)_i]\right), \tag{1}$$

where i is an index that spans the set of "incoming" nodes (702) and edges (704) and $f$ is a user-defined function. Incoming nodes (702) are those that, when viewed as a graph (as in FIG. 2A), have directed arrows that point to the node (702) where the numerical value is computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed in the art. Every node (702) in a neural network (700) may have a different associated activation function. Often, as a shorthand, activation functions are described by the function $f$ by which it is composed. That is, an activation function composed of a linear function $f$ may simply be referred to as a linear activation function without undue ambiguity.

When the neural network (700) receives an input, the input is propagated through the network according to the activation functions and incoming node (702) values and edge (704) values to compute a value for each node (702). That is, the numerical value for each node (702) may change for each received input. Occasionally, nodes (702) are assigned fixed numerical values, such as the value of 1, that are not affected by the input or altered according to edge (704) values and activation functions. Fixed nodes (702) are often referred to as "biases" or "bias nodes" (706), displayed in FIG. 2A with a dashed circle.

In some implementations, the neural network (700) may contain specialized layers (705), such as a normalization layer, or additional connection procedures, like concatenation. One skilled in the art will appreciate that these alterations do not exceed the scope of this disclosure.

As noted, the training procedure for the neural network (700) comprises assigning values to the edges (704). To begin training, the edges (704) are assigned initial values. These values may be assigned randomly, assigned according to a prescribed distribution, assigned manually, or by some other assignment mechanism. Once edge (704) values have been initialized, the neural network (700) may act as a function, such that it may receive inputs and produce an output. As such, at least one input is propagated through the neural network (700) to produce an output. Recall that a given dataset will be composed of inputs and associated target(s), where the target(s) represent the "ground truth", or the otherwise desired output. The neural network (700) output is compared to the associated input data target(s). The comparison of the neural network (700) output to the target(s) is typically performed by a so-called "loss function"; although other names for this comparison function such as "error function" and "cost function" are commonly employed. Many types of loss functions are available, such as the mean-squared-error function. However, the general characteristic of a loss function is that it provides a numerical evaluation of the similarity between the neural network (700) output and the associated target(s). The loss function may also be constructed to impose additional constraints on the values assumed by the edges (704), for example, by adding a penalty term, which may be physics-based, or a regularization term. Generally, the goal of a training procedure is to alter the edge (704) values to promote similarity between the neural network (700) output and associated target(s) over the dataset. Thus, the loss function is used to guide changes made to the edge (704) values, typically through a process called "backpropagation."

Figure 8A:
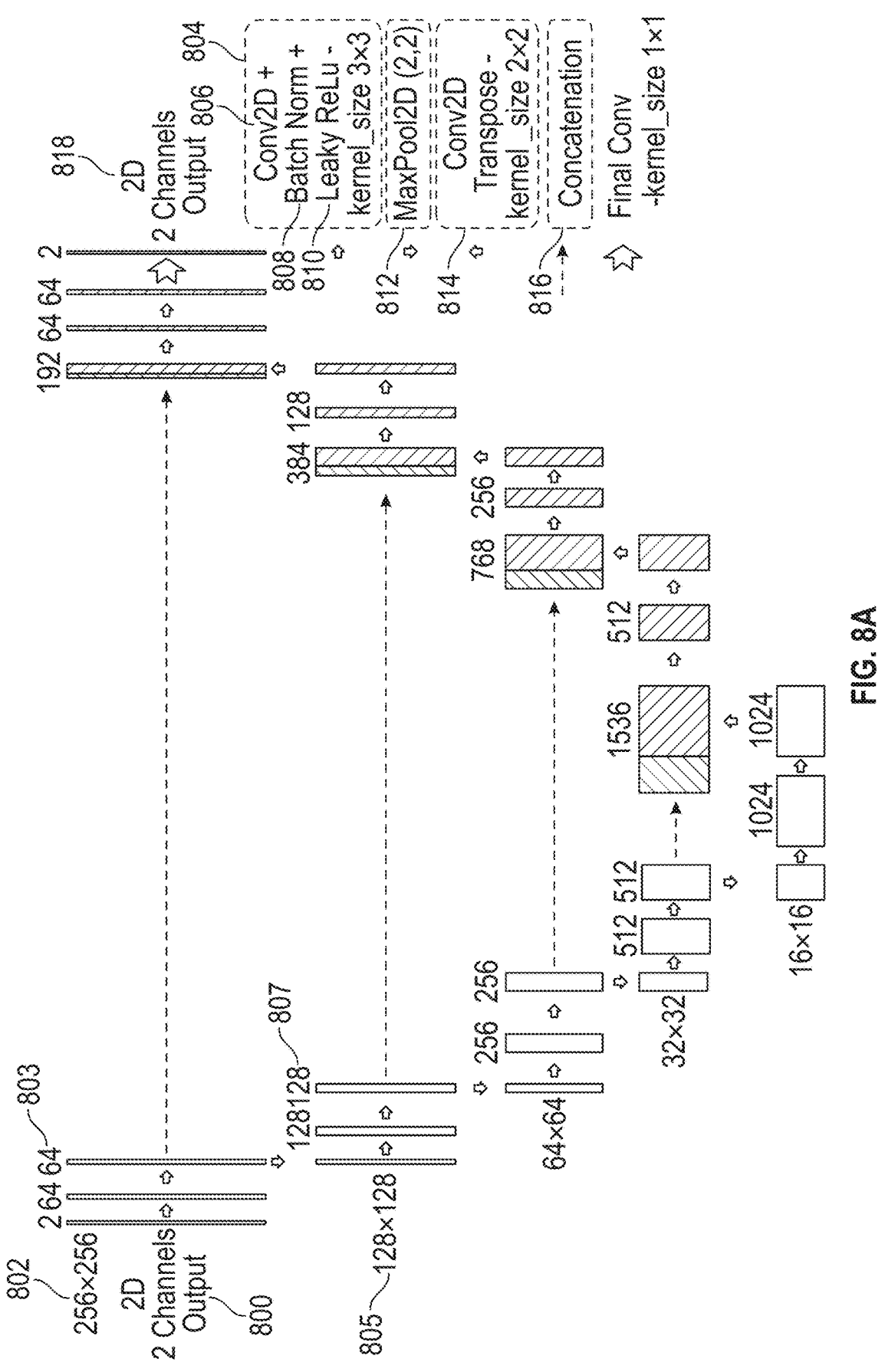
FIG. 8A shows a U-net neural network in accordance with one or more embodiments.

FIG. 8A shows the architecture of the particular kind of neural network used for PZ summation: the U-net. The U-net has a linked neural network structure in the shape of a U. Going down the left side of the U, a sequence of operations are applied to an input array (800) starting with a subroutine called ConvBlock (804). ConvBlock (804) is itself divided into a sequence of subroutines beginning with a Conv2D (806), a 2D convolution of both of two input images (the hydrophone and geophone data) with a 3-by-3 kernel, followed by a calculation of batch norms with the Batch Norm (808) subroutine, followed by passing the result through the leaky rectified linear unit subroutine LeakyReLU (810). The flowchart arrow directed towards the right denotes the ConvBlock (804) operation throughout FIG. 8A. ConvBlock (804) is repeated twice at every level of the U-net, both descending and ascending. The convolution function, Conv2D (806), has an input parameter controlling number of input channels and output channels. Conv2D (806) is a convolutional process using user specified number of kernels. The user may increase or decrease the $3^{rd}$ dimension (the channel size) of the data being convolved. The kernel used in the convolution differ in their size, i.e., 3-by-3, 2-by-3, etc.

The input arrays (800) to U-net are two 256-by-256 images (802), viz, the hydrophone and the geophone data.

They are both placed into a single 256-by-256-by-2 array. Subroutine ConvBlock (804) convolves these images with kernels of different sizes, resulting in a larger third dimension (going from 2 to 34 for this particular example). After ConvBlock (804), a max pool procedure is performed with the subroutine MaxPool (812), which determines the maximum value in windows of four values coming out of the ConvBlock (804) procedure, thus allowing for a reduction in the amount of data. In this way, the input coming out of ConvBlock (804) at the first stage as a 256-by-256-by-64 array enters the second stage as a 128-by-128-by-64 array. The combined operation of ConvBlock (804) and MaxPool (812) is repeated three more times down the left side and to the cusp of the U-net structure, but, in practice, the number of stages may be increased or decreased. The subroutine ConvBlock (804) is applied to the 16-by-16-by-512 image at cusp, and the output is a 16-by-16-by-1024 image. (The size of input and output arrays is variable and may depend on the application.)

For clarity, in FIG. 8A, the size of the arrays being processed at each step is listed along each side of the rectangle representing the array. The size of the rectangles representing the arrays is also proportional to the size of the arrays. For instance, the input array (802) is of size 256-by-256-by-2, which is a long, thin rectangle. Through operation with the ConvBlock (804) subroutine, the third dimension is increased to create a second array (803) of size 256-by-256-by-64. After applying the MaxPool (812) subroutine, the dimensions are reduced along the first two dimensions to produce a third array (805) of size 128-by-128-by-64. After another application of ConvBlock (804), the third dimension is extended to produce a fourth array (807) with size 128-by-128-by-128. This process continues both down and back up the U-shaped structure of the U-net.

Returning up the other side of the U-net, the process is reversed. The transpose of the convolution subroutine, Conv2DTranspose (814), is performed on the images, which has the effect of both convolving and upscaling the image to a larger grid. The upscaling is performed by using a 2-by-2 convolution kernel to interpolate between samples. The result of this convolution is concatenated to the max pooled data coming from the other side of the U-net with the Concatenate (816) subroutine. ConvBlock (804) is then applied to this result. This procedure continues three more times up the right side of the U-net until an output array (818) is reached that has the same size as the original input array.

Figure 8B:
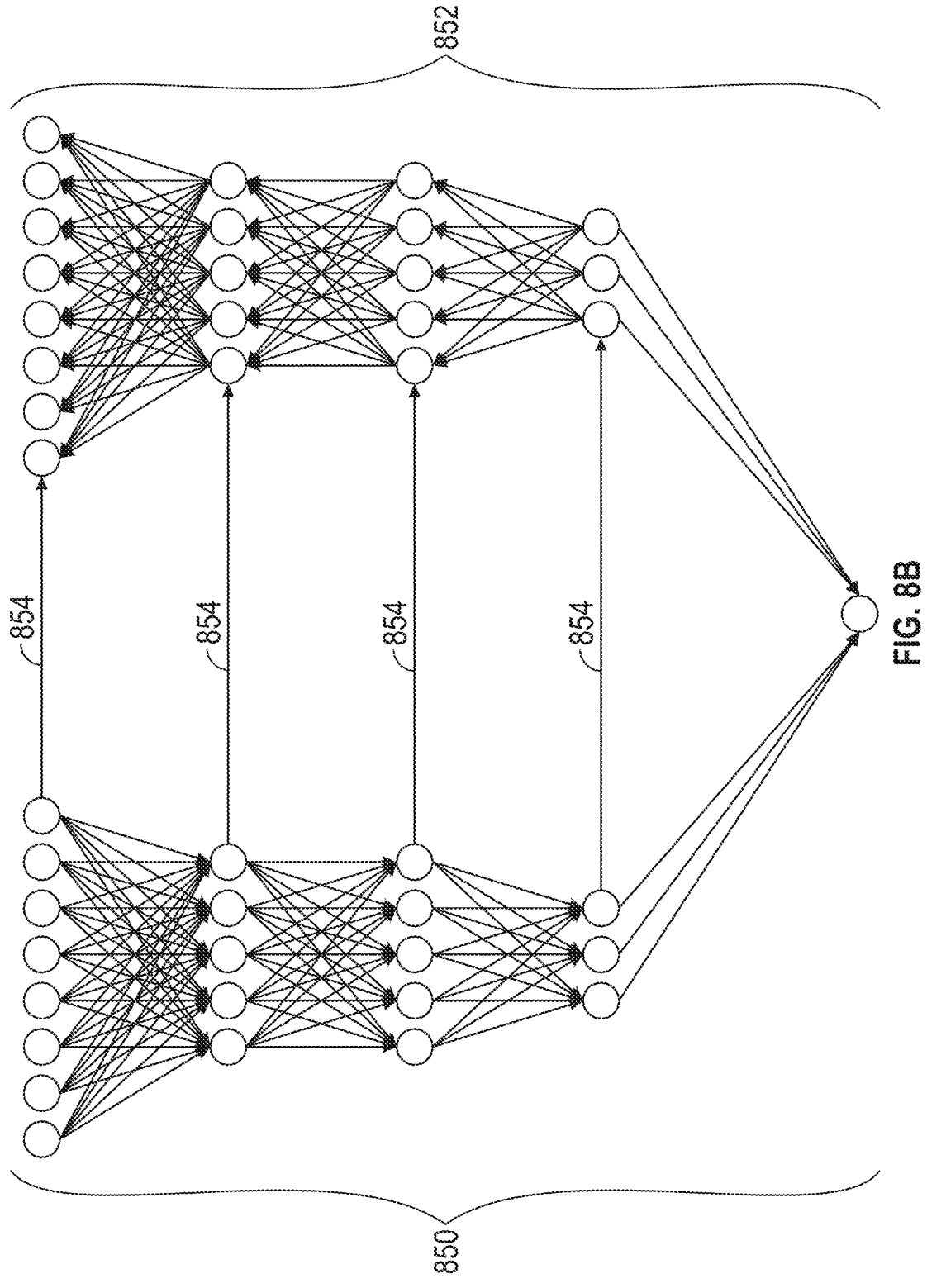
FIG. 8B shows the structure of a U-net neural network in accordance with one or more embodiments.
Figure 9:
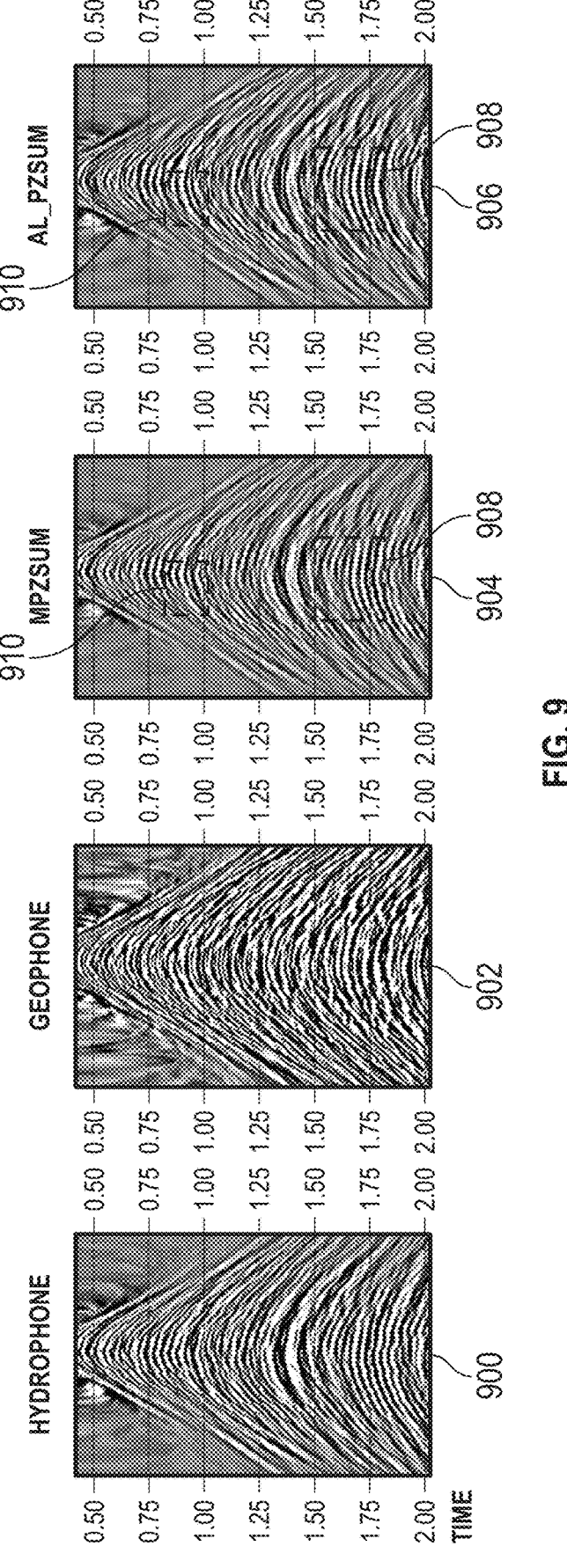
FIG. 9 shows hydrophone data, geophone data, PZ summation data, and result of application of a U-net in accordance with one or more embodiments.

FIG. 8B relates FIG. 8A to FIG. 7. The architecture of the U-net neural network is as if two networks were connected side-by-side. The input goes down the left side connected network (850) of the U-net and returns up the right side connected network (852). Furthermore, there are cross-connections (854) at every level of the U-net between one side and the other. The node weights that are determined are the weights applied to the output of the convolutions at each level of the U-net in FIG. 8A. Training the U-net involves being given many input and output images (i.e., many pairs of hydrophone and geophone data as input and P upgoing and P downgoing data as output), and learning the weights for convolution outputs that optimally that map between them FIG. 9 shows the application of the trained U-net to a real dataset. The first real data image (900) shows a CMP gather obtained from hydrophone data only. The second real data image (902) shows the CMP gather obtained from geophone data only. The third real data image (904) shows a CMP gather obtained from hydrophone and geophone data after a conventional PZ summation method was applied. The fourth real data image (906) shows a CMP gather produced after the U-net was applied to the hydrophone and geophone data. In a first box (908) and a second box (910), the output from the convention PZ summation method and application of the U-net may be compared. The U-net performs as good as or better than the PZ summation, judged by how clearly reflectors appear in each box.

Figure 10:
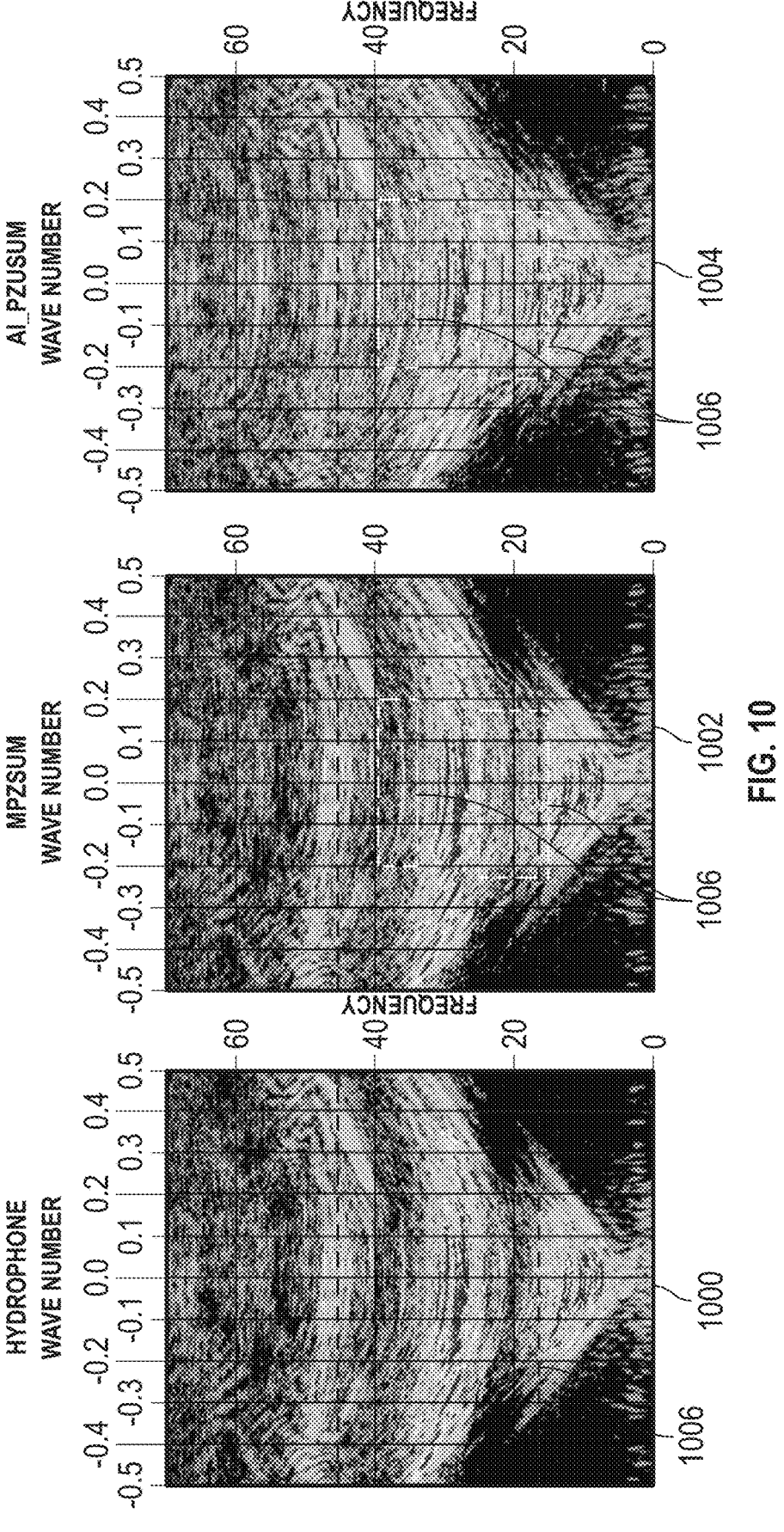
FIG. 10 shows hydrophone data, geophone data, and the result from application of a U-net to both, all in the frequency domain in accordance with one or more embodiments.

FIG. 10 shows the results of the method after transforming the CMPs to the frequency domain. Image 1000 shows the hydrophone CMP data in the frequency domain, image 1002 shows the PZ summation results of the seismic data in frequency domain, and image 1004 shows the results from applying the U-net to the seismic data in the frequency domain. The area in the larger dashed rectangle (1006) crossing all three plots shows key differences. First, energy has been retained in the results from applying the U-net to the data that was either lost or obscured by the traditional PZ summation method. Second, there are notch regions in the smaller curved-edged rectangles (1008) within the second and third images. Notching occurs when two or more seismic pulses (such as a primary reflection and its multiples) superimpose upon each other and destructively interfere at certain frequencies. The interference causes the amplitude spectrum of the recorded data to have one or more pronounced gaps (i.e., notches) at discrete frequencies. Thus, better results present themselves as notches separating areas of greater energy.

FIG. 11 presents a high-level workflow of the method, comprising: At step 1100, generating a simulated seismic training dataset, wherein the simulated seismic training dataset comprises upgoing signals and downgoing signals, each recorded on hydrophones and geophones; at step 1102, training a deep learning network, using the simulated seismic training dataset, to separate the upgoing signals from the downgoing signals; at step 1104, obtaining field hydrophone data and field geophone data pertaining to a subsurface region of interest, recorded by a seismic acquisition system comprising hydrophones and geophones; at step 1106, separating the field hydrophone data and field geophone data into predicted upgoing signals; at step 1108, generating a seismic image of the subsurface region of interest based, at least in part, on the predicted upgoing signals.

Figure 12:
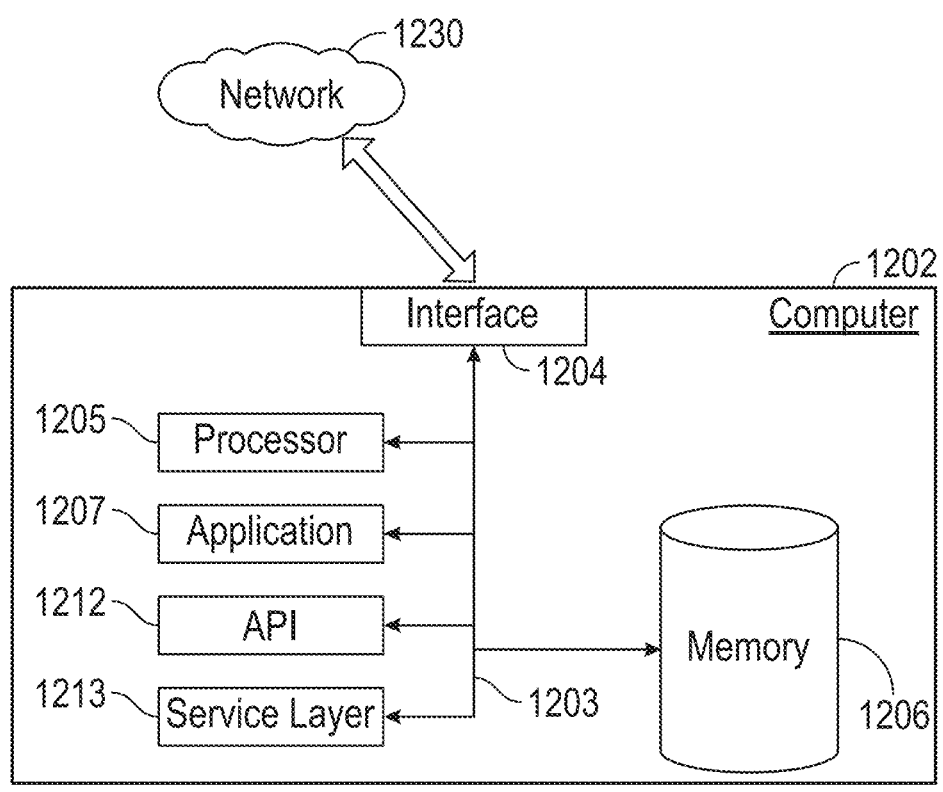
FIG. 12 shows a computer system in accordance with one or more embodiments.

FIG. 12 depicts a block diagram of a computer system (1202) used to provide computational functionalities associated with described algorithms, methods, functions, processes, flows, and procedures as described in this disclosure, according to one or more embodiments. The illustrated computer (1202) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. The illustrated computer (1202) is communicably coupled with a network (1230). In some implementations, one or more components of the computer (1202) may be configured to operate within environments, including cloud-computing-based, local, global, or other environment (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) from a client application (for example, executing on another computer (1202) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203). In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or another suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 6, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (1204) includes logic encoded in software or hardware (or a combination of software and hardware) and operable to communicate with the network (1230). More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 6, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). For example, memory (1206) can be a database storing data consistent with this disclosure. Although illustrated as a single memory (1206) in FIG. 6, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers (1202) associated with, or external to, a computer system containing computer (1202), wherein each computer (1202) communicates over network (1230). Further, the term "client," "user," and other appropriate terminology may be used interchangeably as appropriate without departing from the scope of this disclosure. Moreover, this disclosure contemplates that many users may use one computer (1202), or that one user may use multiple computers (1202).

Figure 13:
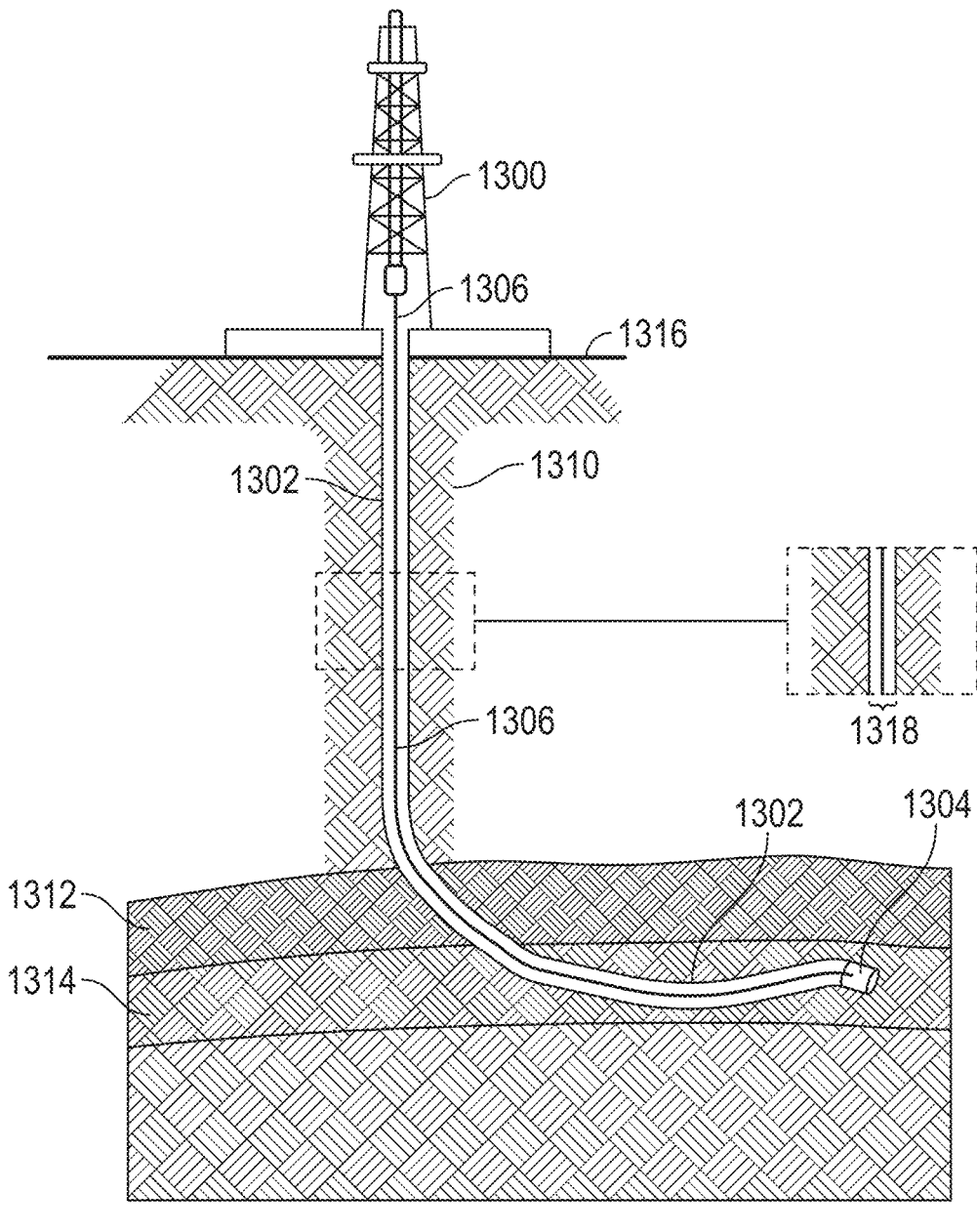
FIG. 13 shows a borehole and a drilling system in accordance with one or more embodiments.

FIG. 13 illustrates systems in accordance with one or more embodiments. Specifically, FIG. 13 shows a well (1302) that may be drilled by a drill bit (1304) attached by a drillstring (1306) to a drill rig (1300) located on the surface of the earth (1316). The borehole (1318) corresponds to the uncased portion of the well (1302). The borehole (1318) of the well may traverse a plurality of overburden layers (1310) and one or more cap-rock layers (1312) to a hydrocarbon reservoir (1314). The seismic data processed with the U-net neural network presented above will provide an improved seismic image that may be interpreted to find the hydrocarbon reservoir (1314). The improved seismic image may identify, using a seismic interpretation workstation, a drilling target based, at least in part, on the seismic image. A borehole trajectory may then be planned, using a borehole planning system, based, at least in part, on the drilling target. A borehole (1318) may then be drilled, guided by the planned borehole trajectory, using a drilling system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
   generating a simulated seismic training dataset, wherein the simulated seismic training dataset comprises upgoing signals and downgoing signals, each recorded on hydrophones and geophones;
   training a deep learning network, using the simulated seismic training dataset, to separate the upgoing signals from the downgoing signals;
   obtaining, from a seismic acquisition system comprising hydrophones and geophones, field hydrophone data and field geophone data from a subsurface region of interest, the field hydrophone data and the field geophone data comprising observed upgoing signals and observed downgoing signals;
   wherein the observed downgoing signals are formed in part by reflected downgoing ghost signals;
   separating, using the trained deep learning network, the observed upgoing signals from the observed downgoing signals to yield predicted upgoing signals with the reflected downgoing ghost signals removed;
   generating a seismic image of the subsurface region of interest based, at least in part, on the predicted upgoing signals;
   identifying, using a seismic interpretation workstation, a drilling target based, at least in part, on the seismic image, and
   planning a planned borehole trajectory, using a borehole planning system, based, at least in part, on the drilling target.

2. The method of claim 1, wherein generating the simulated seismic training dataset comprises:
   creating, using a random number generator, a plurality of reflectivity surfaces; and
   convolving a wavelet with the plurality of reflectivity surfaces.

3. The method of claim 1, wherein the deep learning network is a U-net neural network.

4. The method of claim 3, further comprising at least one operation selected from the group consisting of: a convolution, a max pooling, a transpose convolution, and a concatenation.

5. The method of claim 1, wherein generating the simulated seismic training dataset further comprises at least one selected from the group consisting of: creating coherent noise, random noise, and amplitude distortion.

6. The method of claim 1, wherein the simulated seismic training dataset further comprises:
   an input dataset, comprising a linear superposition of upgoing signals and downgoing signals;
   a first output dataset comprising upgoing signals; and
   a second output dataset comprising downgoing signals.

7. The method of claim 1, wherein the hydrophones and geophones are arranged in collocated pairs, each pair comprising one hydrophone and one geophone.

8. The method of claim 1, wherein the seismic acquisition system comprises ocean bottom cables.

9. The method of claim 2, wherein the plurality of reflectivity surfaces comprises hyperbolas.

10. The method of claim 1, comprising:

drilling, using a drilling system, a borehole guided by the planned borehole trajectory.

11. A non-transitory computer-readable memory comprising computer-executable instructions stored thereon that, when executed on a processor, cause the processor to perform steps comprising:

generating a simulated seismic training dataset, wherein the simulated seismic training dataset comprises upgoing signals and downgoing signals, each recorded on hydrophones and geophones;

training a deep learning network, using the simulated seismic training dataset, to separate the upgoing signals from the downgoing signals;

obtaining, from a seismic acquisition system comprising hydrophones and geophones, field hydrophone data and field geophone data from a subsurface region of interest, the field hydrophone data and the field geophone data comprising observed upgoing signals and observed downgoing signals;

wherein the observed downgoing signals are formed in part by reflected downgoing ghost signals;

separating, using the trained deep learning network, the observed upgoing signals from the observed downgoing signals to yield predicted upgoing signals with the reflected downgoing ghost signals removed;

generating a seismic image of the subsurface region of interest based, at least in part, on the predicted upgoing signals;

identifying, using a seismic interpretation workstation, a drilling target based, at least in part, on the seismic image, and planning a planned borehole trajectory, using a borehole planning system, based, at least in part, on the drilling target.

12. The non-transitory computer-readable memory of claim 11, wherein generating the simulated seismic training dataset comprises:

creating, using a random number generator, a plurality of reflectivity surfaces; and convolving a wavelet with the plurality of reflectivity surfaces.

13. The non-transitory computer-readable memory of claim 11, wherein the deep learning network is a U-net neural network.

14. The non-transitory computer-readable memory of claim 11, wherein generating the simulated seismic training dataset further comprises at least one selected from the group consisting of: creating coherent noise, random noise, and amplitude distortion.

15. The non-transitory computer-readable memory of claim 11, wherein the simulated seismic training dataset further comprises:

an input dataset, comprising a linear superposition of upgoing signals and downgoing signals; and an output dataset comprising separate upgoing signals and downgoing signals.

16. The non-transitory computer-readable memory of claim 11, wherein the hydrophones and geophones are arranged in collocated pairs, each pair comprising one hydrophone and one geophone.

17. A system, comprising:

a field hydrophone and a field geophone; and a computer system, configured to:

generate a simulated seismic training dataset, wherein the simulated seismic training dataset comprises upgoing signals and downgoing signals, each recorded on hydrophones and geophones;

train a deep learning network, using the simulated seismic training dataset, to separate the upgoing signals from the downgoing signals;

obtain, from a seismic acquisition system comprising the hydrophone and geophone, field hydrophone data and field geophone data from a subsurface region of interest, the field hydrophone data and the field geophone data comprising observed upgoing signals and observed downgoing signals;

wherein the observed downgoing signals are formed in part by reflected downgoing ghost signals;

separate, using the trained deep learning network, the observed upgoing signals from the observed downgoing signals to yield predicted upgoing signals with the reflected downgoing ghost signals removed;

generate a seismic image of the subsurface region of interest based, at least in part, on the predicted upgoing signals;

identify, using a seismic interpretation workstation, a drilling target based, at least in part, on the seismic image, and plan a planned borehole trajectory, using a borehole planning system, based, at least in part, on the drilling target.

18. The system of claim 17, wherein the deep learning network is a U-net neural network.

* * * * *